Sept. 2, 1969  F. FOULET  3,464,100
PROCESS FOR THE MANUFACTURE OF PISTONS MADE OF A LIGHT
ALLOY AND HAVING A COOLING FLUID CIRCULATION
ARRANGEMENT, FOR INTERNAL COMBUSTION ENGINES
Filed Sept. 8, 1964  2 Sheets-Sheet 1

INVENTOR
François FOULET
BY

ATTORNEY

INVENTOR
François FOULET
BY
ATTORNEY

3,464,100
PROCESS FOR THE MANUFACTURE OF PISTONS MADE OF A LIGHT ALLOY AND HAVING A COOLING FLUID CIRCULATION ARRANGEMENT, FOR INTERNAL COMBUSTION ENGINES

François Foulet, Gasny, France, assignor to Societe A.M.O., Colombes, France
Filed Sept. 8, 1964, Ser. No. 394,983
Claims priority, application France, Sept. 8, 1964, 946,673
Int. Cl. B23p 15/10
U.S. Cl. 29—156.5                         3 Claims

ABSTRACT OF THE DISCLOSURE

In an internal combustion engine, a method for obtaining a cooling fluid flow channel in the body of a piston by drilling separate holes in said piston starting from the outer or inner surface thereon; machining said channel starting from said holes by known means and plugging the holes with the exception of the cooling fluid inlet.

---

The invention relates to internal combustion engine pistons which are made preferably of forged aluminium alloy and are capable of attaining high temperatures during operation.

Since the special, resistant alloys generally utilised never retain, during utilisation, their original mechanical characteristics, due to progressive re-heating, it is necessary to cool the piston, this being generally done by circulating a fluid which is capable of diminishing the temperature by 80 to 100° C. It is important that this cooling should be localised in the zone of the piston ring grooves in order to prevent deformations and, to this end, it is already known to form an annular duct in the thickness of the piston opposite the zone of the said grooves, but the said duct is formed by the previous machining of an open groove on the piston head the upper portion of which is closed by adding metal, or of an annular recess in the zone of the rings at the bottom of which the fluid circulation duct is formed, whereafter the said duct is closed by means of a metal sleeve secured by welding. However, the closing of the duct or of the recess is effected by the autogenous welding of the added metal and the weld zone is necessarily brought to a high temperature, so as to produce modified texture and crystallisation and to set up heterogenous zones of diminished resistance in a portion of the piston which, on the contrary, should have the maximum mechanical resistance.

An object of the invention is to provide an annular duct intended for the circulation of the cooling fluid formed by previous machining either in the outer surface of the piston, preferably below the zone of the piston rings but above the piston gudgeon pin, or in the inner surface, or in the end face of the piston itself, of a predetermined number of equidistant recesses which have the depth necessary for the positioning of the duct to be formed and which are distributed over the surface in appropriate number in such manner as to leave the surface of the piston intact between two adjacent recesses; by means of the engagement of machining means through each recess, it is possible to form a fraction of the said duct, in such manner that two contiguous fractions contact each other and that, gradually, the machining means engaged in all the recesses successively form an annular continuous duct.

The machining means used for the formation of the said duct may be mechanical or electrical or may operate by electro-erosion or the like; it suffices to provide recesses the number of which is appropriate and the dimensions of which are adequate to permit the engagement of the selected tool and then to proceed after the said engagement either to the rotation, or to the translation, or to these two movements combined, of the tool, combined with the rotation of the piston.

When the annular duct has been formed, the recesses may be blocked either (preferably) by annular segments engaged with clamping and mechanically fixed by any appropriate means or even by welding in a zone of the piston which, generally, is not subjected to the action of high temperatures.

Figure 1:
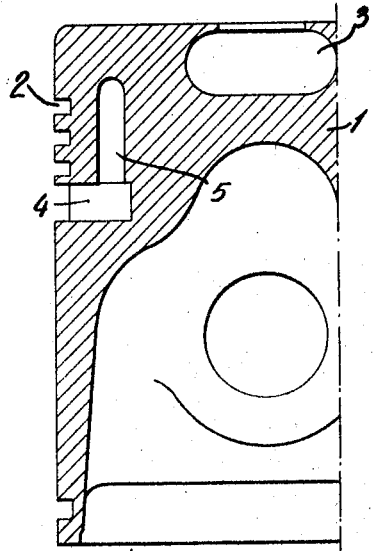
FIG. 1 is a longitudinal section taken along I—I of FIGURE 2, which represents a partial external view of the piston.
Figure 2:
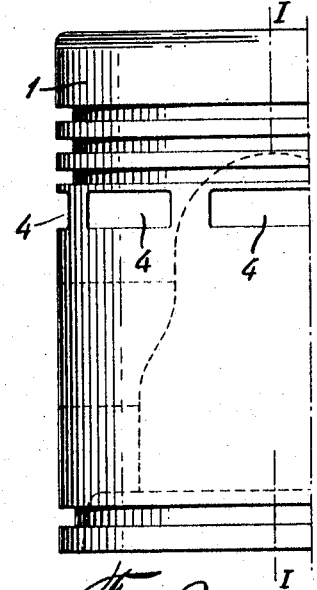
Figure 3:
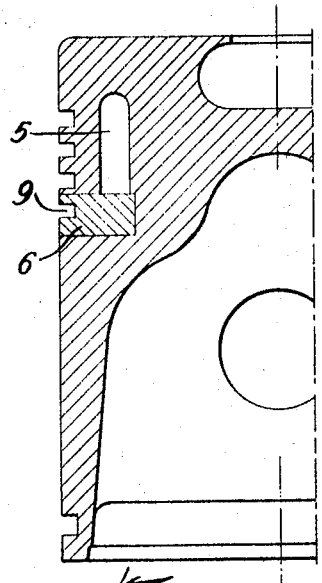
FIGURE 3 shows the same piston after the blocking of the recesses.
Figure 6:
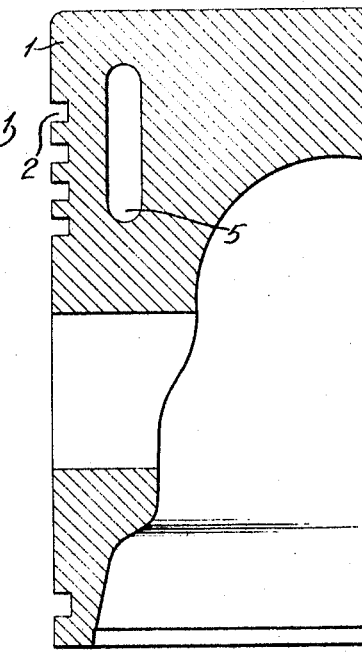
FIGURE 6 is a longitudinal section through a piston along a plane extending through two recesses, immaterially of the positioning of the said recesses.

The piston comprises a body 1, a series of piston ring grooves 2 of conventional type and, in some cases, a pre-combustion chamber 3. Referring to FIGURES 1 to 3, recesses 4 may be distributed over the skirt in a suitable number; there may be four, six such recesses, or more, depending on the dimensions of the tool selected; the said recesses are rectangular and leave the surface of the piston intact between them. The depth corresponds to the positioning and to the dimensions of the annular duct 5. The tool introduced, which is either a mechanical or electrical tool permits due to its own displacement and due to that of the piston the machining of a continuous annular groove. When the duct has been formed, the recesses 4 are blocked by annular segments 6, in such manner as to reconstitute a continuous external surface in which it will be possible, if necessary, to machine a groove 9 for a supplementary ring. The duct may be cylindrical or conical, i.e. parallel to the vertical axis of the piston, or inclined relatively to the said axis. FIGURE 6, which is a longitudinal section through a piston taken along a plane extending through two recesses 4, shows the completed duct.

Figure 4:
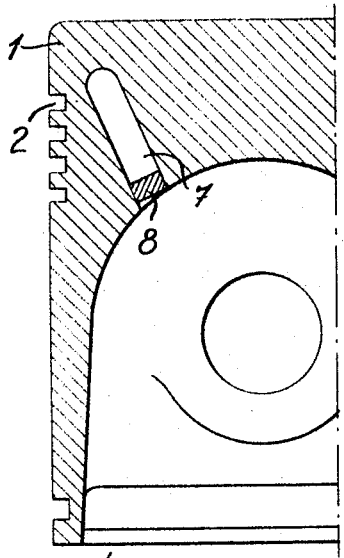
FIGURE 4 is a longitudinal section of a piston the annular duct of which has been machined in the interior of the piston.

The machining may also be carried out within the piston when the dimensions of the latter permit this procedure, as shown in FIGURE 4; the duct 7 is finally blocked at 8 by adding material, or in any other desired way.

Figure 5:
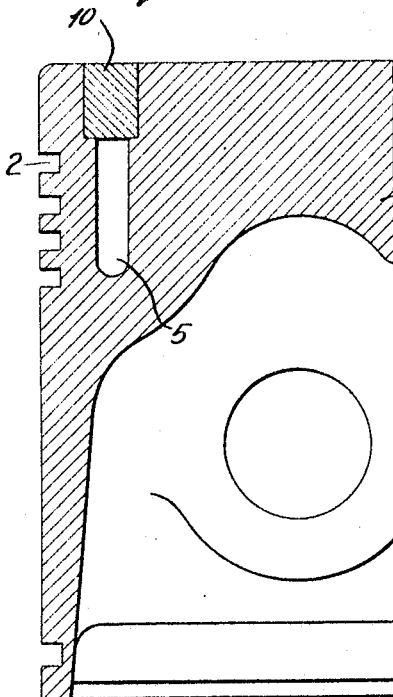
FIGURE 5 is a longitudinal section through a piston the duct of which has been formed by means of recesses in the end face of the piston, the section being along II—II of FIGURE 7 which illustrates a half-plan view of the piston.
Figure 7:
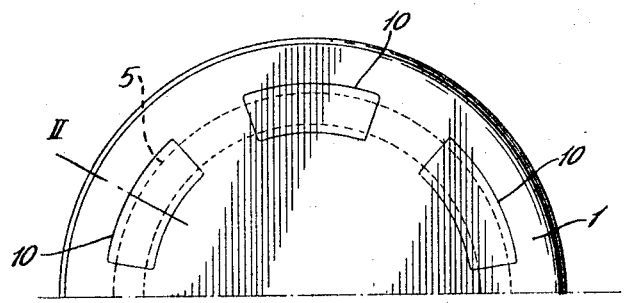

According to FIGURES 5 and 7, recesses 10 distributed in an appropriate number may be formed in the end face itself of the piston and through these recesses there is introduced the tool machining a continuous duct 5 blocked in its upper portion 10 by adding material, in such manner as to restore a continuous surface.

It will be clear that many modifications of a constructional nature could be applied without exceeding the scope of the invention, notably with regard to the recesses through which the tool can be engaged and with regard to the progressive displacement thereof in such manner that the portions of the duct formed opposite each recess join up so as to finally constitute a continuous annular groove.

What I claim is:
1. In an internal combustion engine, a method of ma- chining a circumferential cooling fluid flow channel in the body of a piston, characterized in the steps of:
(a) drilling a plurality of separate holes through said body and distributed circumferentially around the said body;
(b) machining a portion of a circumferential channel from the bottom of each hole in the direction of adjacent holes and to an extent such that adjacent portions merge into one another to define an uninterrupted circumferential channel, then
(c) plugging said holes up to said channel with the exception of those holes necessary for the ingress and egress of said cooling fluid.

2. A method as claimed in claim 1, wherein said holes extend radially inward from the outer surface of said body.

3. A method as claimed in claim 1, wherein said body is hollowed out to define an inner chamber and wherein said holes extend outward from said inner chamber.

References Cited

UNITED STATES PATENTS 3,052,013  9/1962  Kane _____ 29—157

FOREIGN PATENTS 762,820   11/1952  Germany.
1,143,043  1/1963  Germany.

PAUL M. COHEN, Primary Examiner

U.S. Cl. X.R.

92—120

UNITED STATES PATENT OFFICE
CERTIFICATE OF CORRECTION

Patent No. 3,464,100                             September 2, 196

François Foulet

It is certified that error appears in the above identified patent and that said Letters Patent are hereby corrected as shown below:

In the heading to the printed specification, line 9, "Sept. 8, 1964" should read -- Sept. 5, 1963 --.

Signed and sealed this 21st day of April 1970.

(SEAL)
Attest:

Edward M. Fletcher, Jr.
Attesting Officer

WILLIAM E. SCHUYLER, JR
Commissioner of Patents